United States Patent [19]

Maring et al.

[11] Patent Number: 4,812,904
[45] Date of Patent: Mar. 14, 1989

[54] OPTICAL COLOR ANALYSIS PROCESS

[75] Inventors: Richard B. Maring; Martin L. Shoemaker, both of Wyoming, Mich.

[73] Assignee: Megatronics, Incorporated, Grandville, Mich.

[21] Appl. No.: 895,499

[22] Filed: Aug. 11, 1986

[51] Int. Cl.⁴ .............................................. H04N 7/18
[52] U.S. Cl. ..................... 358/107; 358/80; 358/76; 382/17
[58] Field of Search ............ 358/75, 80, 76, 107; 382/17, 52; 364/526

[56] References Cited

U.S. PATENT DOCUMENTS

| | | | |
|---|---|---|---|
| 4,097,892 | 6/1978 | Balding | 358/80 |
| 4,285,580 | 8/1981 | Murr | 358/80 |
| 4,574,393 | 3/1986 | Blackwell et al. | 382/17 |
| 4,583,186 | 4/1986 | Davis et al. | 358/80 |
| 4,642,682 | 2/1987 | Orsburn et al. | 358/80 |
| 4,646,134 | 2/1987 | Komatsu et al. | 358/80 |
| 4,649,566 | 3/1987 | Tsunoda et al. | 358/80 |
| 4,698,669 | 10/1987 | Sekizawa et al. | 358/80 |

Primary Examiner—James J. Groody
Assistant Examiner—John K. Peng
Attorney, Agent, or Firm—Waters, Morse & Harrington

[57] ABSTRACT

A process for color analysis and comparison among reference and test samples for use in quality control applications or the like comprises illuminating each sample under predetermined lighting conditions, scanning the sample with a color video camera, digitalizing the video signal output to produce a digitized signal representative of the components of the color values, preferably the red-green-blue and brightness values ("RGBW"), for each pixel representative of the viewed signal, and reporting and storing the digitized data for subsequent analysis, comparison, display and printout. For comparison purposes, the pixel color values for the samples are analyzed and compared statistically to determine if the reference and test sample match. In one test, the mean of the pixel color value for each sample is ascertained and the test sample is analyzed to determine if its mean is within a tolerance limit for the reference sample expressed in terms of standard deviation values. Various statistical tests provide useful information.

20 Claims, 2 Drawing Sheets

OPTICAL COLOR ANALYSIS PROCESS

BACKGROUND OF THE INVENTION

This invention relates to an optical color analysis process and more particularly to a video color recognition and comparison process for use in quality control, color grading, shade sorting, color durability testing and the like.

There are numerous commercial situations where an accurate evaluation and analysis of color is important. As an example, in the manufacture of pigmented plastics products, it is desirable that all products of the same type be approximately the same color. Generally this means that the color should be fairly close to a predetermined sample color. Exact color matching in all circumstances is not possible, so some color variation is generally accepted.

Other applications for the same type of process are in color grading, classification and sorting, shade sorting, and color durability testing (wherein color change from exposure conditions is calculated).

The most common method for color analysis is visual inspection by the human eye. The human eye has a capability of seeing a great number of colors and can discern fine differences in color shading. A problem with the human eye, however, is that it lacks memory, that is, the ability to recall exactly what a previously inspected color looks like. Thus, side by side comparisons are necessary in a manual color inspection system. Another problem with the human eye is that it lacks the capability of accurately determining how much different two dissimilar colors are and whether a dissimilar color fits within certain tolerance limits. The human eye also has difficulty in ascertaining the characteristics of color differences (i.e., whether one color contains too much red or too little blue or the like). Subjective and personal considerations also come into play in a purely manual viewing system.

Many attempts have been made to provide a more objective and measurable substitute for the human eye. One of the most prominent methods is the use of a spectrophotometer. In a spectrophotometer system, reflected light is broken into its component colors by means of a prism or a diffraction grating, and electro-optical sensors, such as photodiodes physically placed in the path of the various colors in the spectrum sense the energy levels for each color in the spectrum. The outputs of these photodiodes are reproduced in a graph showing the energy levels of the various wave lengths in the visible spectrum. These curves, called spectral distribution curves, can be compared with the spectral distribution curves of other objects in order to determine if the colors of two objects are the same.

Spectrophotometer equipment is quite expensive and has a number of drawbacks. The equipment sees only a single color averaged over the entire viewing screen and thus can analyze only one color at a time. Such equipment is also sensitive to differences in texture and ambient lighting conditions. Moreover the equipment does not produce output results that are always consistent with the human eye. Thus, the human eye may perceive a match, while the equipment indicates that the colors are different. Conversely, the human eye may perceive differences while the equipment indicates that the colors are the same.

It is an object of the present invention to provide a simpler and more effective system for color analysis and color comparison that provides reproducible results consistent with the observations of the human eye.

SUMMARY OF THE INVENTION

In accordance with the present invention, a process for color analysis and comparison among reference and test samples for use in quality control applications or the like comprises illuminating the reference sample under predetermined lighting conditions, scanning a viewing region in the reference sample with a color video camera, digitizing the video signal output so as to produce a digitized signal representative of the components of the color values, preferably the red-green-blue ("RGB") values and in some cases also the brightness value of the viewed signal, and determining tolerance limits for variations from the measured signal that are acceptable.

A viewing region in the test sample is then scanned with the color video camera under the same lighting conditions. The video output signal is digitized into RGB and brightness ("RGBW") values and these values are compared with the tolerances for the reference sample to determine if the test sample is within the tolerance ranges of the reference sample.

A color video camera (preferably a CCD or charge coupled device) is used for the optical scanning. However, any whiteness compensation or automatic gain control ("AGC") circuitry in the camera is disabled so that differences in lighting values can be detected. The video signal is digitized by a color graphics board, preferably an AT&T Targa board or a board having at least the capabilities and resolution of the AT&T ICB board. A standard personal computer, such as an AT&T PC 6300 or comparable machine, can be employed for storing and reporting the color analysis data and performing various calculations on the data, such as computation of tolerances, comparison of values, analysis of different areas in the test screen for color characteristics and the like. The results can be displayed or reported on a video monitor or printer that shows graphically the results of the analyses in terms of numerical values of the RGBW components and actually shows the appearance of the various color components and the appearance of the colors that their tolerances permits, as well as the percentage differences in red, green, blue, magenta, cyan, yellow, darkness and brightness. A visual comparison of the test and reference samples also is provided. A color printout also can be provided.

Any background included in the viewing region for a sample can be automatically eliminated from the comparative signal, leaving only the test and reference signals for analysis. The process also permits reanalysis of the background signal and calibration of the camera by analysis of reference samples of known color. This will reveal any float or drift of the sensors in the video camera.

An important feature of the present invention is that color values for a viewing region are generated, stored, and analyzed in the form of separate color values for each pixel in the viewing image. This creates a large number, generally thousands, of color values in a viewing region. This data is analyzed statistically to determine the full characteristics of the color. In one aspect of the invention, standard deviations from a mean color value are used in a range test to determine acceptable or tolerable variation ranges from the mean values of reference sample colors. A number of other statistical tests can be used to provide useful color analysis information and comparisons.

These and other advantages and features of the present invention will hereinafter appear. For purposes of illustration, but not of limitation, a preferred embodiment of the present invention is described below and shown in the appended drawings.

DETAILED DESCRIPTION OF PREFERRED EMBODIMENTS

Figure 1:
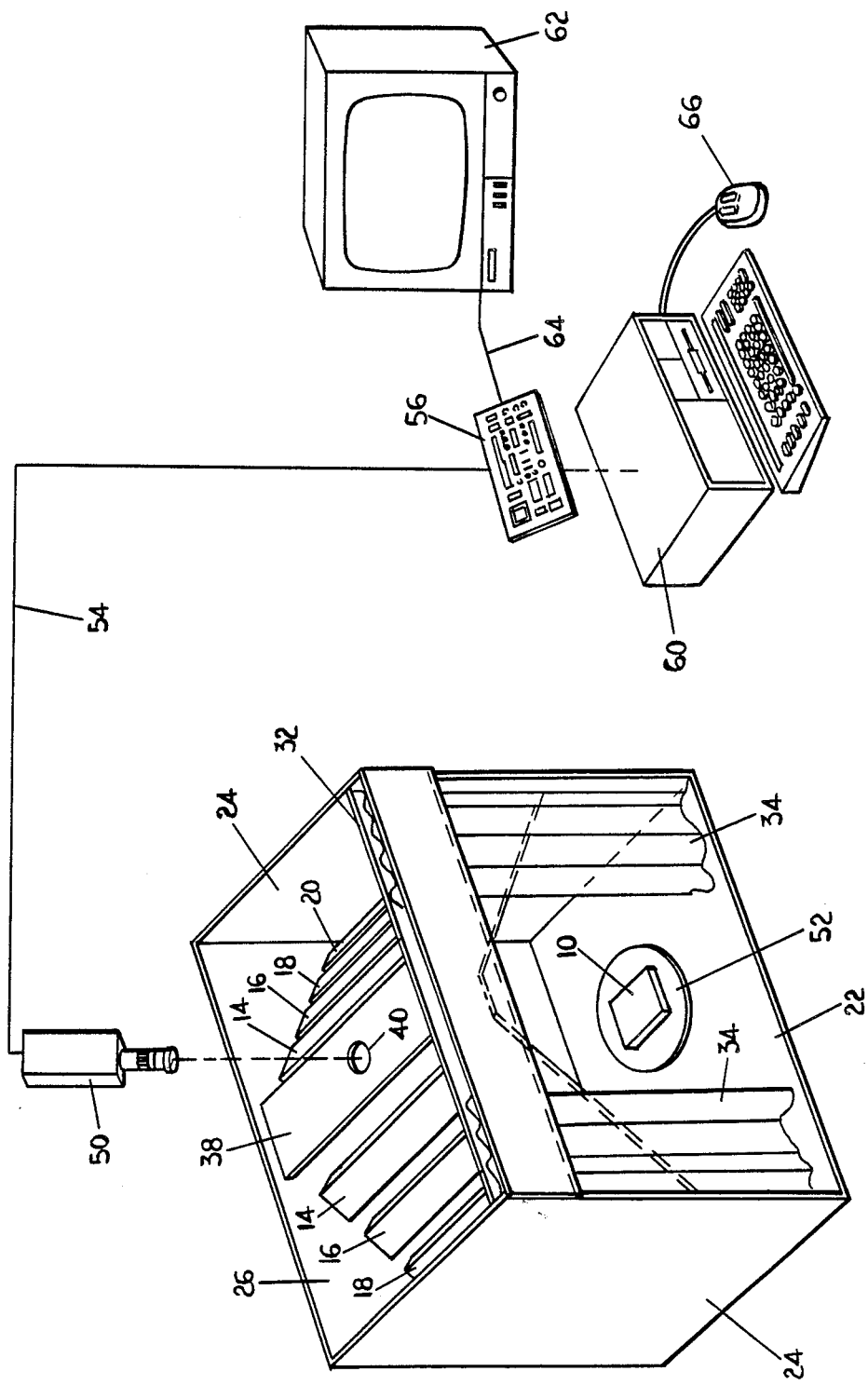
FIG. 1 is a schematic view of a color analysis system employing the process of the present invention.
Figure 2:
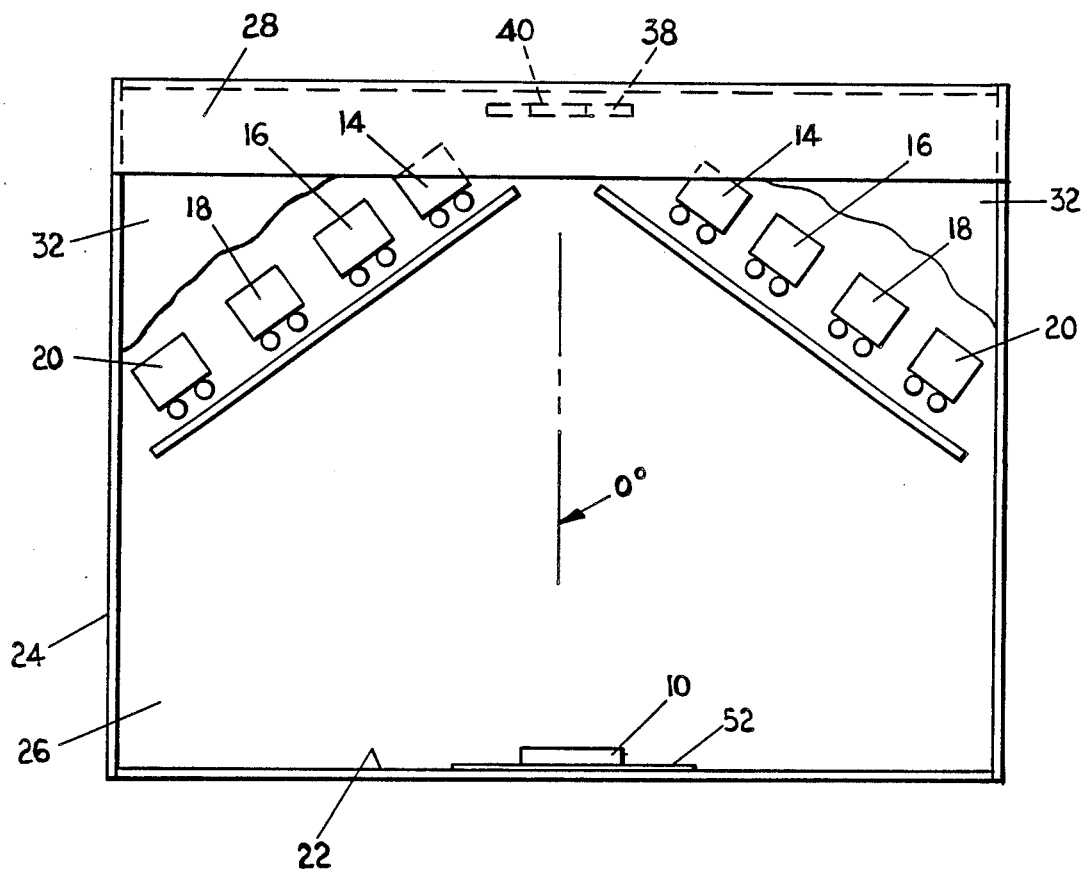
FIG. 2 is a front elevational view of the light box of the present invention.

In accordance with the present invention, a color analysis system employing the process of the present invention is shown in FIG. 1. Articles 10 for reference or test purposes are placed in a light booth 12 for illumination under selected lighted conditions. Light booth 12 includes separate light sources for providing daylight emulation at 7500K; horizontal emulation at 3200K; cool white fluorescent illumination; and ultra-violet fluorescent lighting. These light sources may be positioned as light sources 14, 16, 18, and 20, respectively. Desirably the light is positioned at a 45° angle with respect to the samples being viewed, with the light sources being positioned on both sides of the samples so that shadows are not produced.

Light box 12 comprises a base 22 having a background surface of predetermined characteristics applied thereto. Alternatively a background material can be placed on the base 22. The box also has sides 24 and a back 26. The front of the box includes a cross member 28. A second member 32 is positioned behind member 28 leaving a space between the two members. A closable curtain 34 is slidably mounted on a rod 36 between members 28 and 32 in order to enclose the light box and prevent infiltration of ambient light.

Cross member 38 extends between members 32 and 26 at the top of the box and includes an opening 40 for the lens of a video camera. This opening is intended to position the video camera directly above the object to be viewed, which shall be referred to as a 0° angle.

Lights 14, 16, 18, and 20 are fluorescent lights that extend between members 32 and 26 and are inclined at an angle with respect to the bottom of the box. They are grouped together on each side of the light box, so that the light impinges on the object or sample 10 at the bottom of the box at approximately a 45° angle. The actual angles of the individual lights vary between 40° and 60°.

Referring again to FIG. 1, video camera 50 is mounted on opening 40 in the light box. Video camera 50 desirably is a CCD (charge coupled device) color video chip camera. Such cameras are made by several companies, including Mitsubishi, Javelin, Panasonic, and NEC. The cameras have a resolution of about 182,000 to 260,000 pixels. The cameras are conventional cameras except that any automatic gain circuitry ("AGC") or whiteness compensation circuitry is disabled. This is necessary so that the camera can detect differences in levels of light and illumination. Camera 50 scans a viewing area in the bottom of the light box that includes object 10 and background 52.

With one type of camera, an RGY signal is converted by the camera circuitry to an NTSC (or PAL in Europe) electronic signal, and the signal is transmitted by means of a standard NTSC line 54 to a color graphics board 56. A color graphics board manufactured by AT&T and known as an ICB (image capture board) is satisfactory. The AT&T ICB board has 32,000 colors and a resolution of about 256×200. The board also is capable of digitizing the image at approximately the speed of the camera. This makes the board capable of displaying data in a real time mode.

The ICB board converts the color signal into red, green, and blue digital values, each having a value scale of zero to 31. These values are transmitted to a central processing unit 60 for storage and manipulation. The video output of the computer also can be transmitted directly to an analog RGB color monitor 62 through line 64 for a real time display. In most operations, however, the video output is first digitized and stored in the computer before being transmitted to the monitor.

In an improved system, the camera is provided with a chip that makes it possible to transmit an RGB signal directly from the camera via three separate cables, eliminating the need for an encoder board to convert an RGY signal to an NTSC signal. It is also preferred to use an AT&T Targa color graphics board. This board has 16 million colors and a resolution of 512×400, providing a much higher quality picture. In this system, the computer converts the analog signal to digital for data manipulation and outputs an analog signal to the monitor. This system can reduce noise from the signal very substantially.

CPU 60 is a conventional personal computer. An AT&T PC 6300 personal computer having at least a 10 megabyte hard disc is desirable. A mouse 66 also is desirably employed to facilitate implementation of the computer process.

The color analysis functions of the present invention desirably are accomplished by means of a computer program implemented by CPU 60. The computer program first converts the RGB values into a full scale of values that are desirable for color analysis and comparison purposes. In addition to the values of R, G, and B, a "W" value also is created. The W value is a value equal to the average of the R, G, and B values. This produces a composite RGB value wherein the values of R, G, and B are the same, thus producing a brightness reading on a white-black scale.

An important feature of the present invention is that tolerance limits and color comparisons are established by means of statistical evaluation of color data. The color component values are generated by the video camera on a pixel by pixel basis for any given viewing region, creating a large number, up to many thousands, of individual color values for the region. Individual color values are produced for each color component (RGBW) and these are analyzed statistically to determine the nature and character of the color and the variation in color over the viewing region. This data is in numeric form, with each red, green, or blue color being represented by a numeric value of 0 to 31, with the number 31 representing the highest color value and 0 representing an absence of that color. These numeric values can be manipulated by known established methods to determine the variation in color component values in the viewing region.

One desirable analysis of the color value is to determine the mean value and apply standard deviation principles to determine an acceptable deviation from the mean value in terms of standard deviation values. Acceptable statistical tests include a t-Test, F-Test, the Kolmogorov-Smirnov test, analysis of variance, Chi squared test, and a linear regression test. Other tests can also provide meaningful comparative data.

Comparison by statistical analysis is made possible by the pixel by pixel storage of video camera data. Each pixel value represents a small color sampling or test area and the large number of pixel values for a viewing region (on the order of at least one thousand pixels and generally much more) make it possible to analyze color variations among the individual pixel readings in order to determine how the color varies over the viewing region. A spectrophotometer, on the other hand, just produces a single color reading representation of an average color over an area.

In comparing data by reference to standard deviations, the standard deviation value represents a range of values from the mean that includes a predetermined percentage of the values. For example a standard deviation of 1.0 includes 68% of the number of values. Higher standard deviation numbers include greater percentages of the number of values. The smaller the standard deviation value, the more narrow the tolerance.

The process of the present invention as implemented by the computer program makes it possible for a single color in any selected region in the viewing area to be analyzed for RGBW values and stored in the CPU and manipulated and compared as desired.

Considering the operation of the present process for viewing a single object, when the viewing region selected by the operator includes the background, the background color can first be scanned and digitized and stored as background. A tolerance for the background can be selected as a function of the standard deviation of the R, G, and B values of the background color. The processor can be instructed to ignore or cancel any colors from the screen that conform with the background color, thus eliminating background from the active consideration of the unit.

Generally, the background is not present in the viewing region selected, so elimination of background is not necessary. In such a case, when an object is placed in the viewing area, a region in the object is first selected for viewing. The region may be a single pixel in the object image or it can be a region defined by a box, a circle, or other area defined on the object. At this point, the object is displayed on the video monitor, and a mouse or the like can be employed to draw or define a line representing the region on the object.

After the region has been defined the color value of each pixel representative of that region is digitized and stored as test data in the processor memory. A tolerance level is then selected for the color. When a standard deviation range test is employed and background is in the viewing region, a background tolerance level of a standard deviation of 3.0 generally is selected for the RGB values of background color in order to provide wide limits for background color. In such a case, a white value standard deviation equal to the square root of 3.0 is used. A more narrow tolerance level of a standard deviation of 1.0 generally is employed for the RGB values of the sample. In that case, a standard deviation for the white value is one divided by the square root of 3.0. The standard deviation for white is always less than the standard deviation for the color values. Colors representative of the outer limits of the tolerance levels can be displayed on the video monitor for manual checking of the accuracy or desirability of the colors. These colors also can be displayed on a bar chart on the video monitor.

The same procedure can be employed to store other test regions on the object and to store similar information about test regions on other test objects. For example, the first test object could be a master or a reference sample, and subsequent samples could be test samples. Such a procedure might be employed in a quality control procedure where test samples are intended to conform within specific variances of a master sample.

The process of the present invention contemplates that the stored values from a master sample can be compared with comparable stored values of a test sample. The test sample can be determined to be within the tolerance levels of the master sample. Conversely, it can be determined if the master sample conforms within tolerance levels set for the test samples. The processor can be instructed to compare the data in such a way that matching pixels are shown to be white on the video monitor and an overall percentage match can be calculated. Pixels that do not match can be shown to be their natural color on the monitor.

When a test color comes within the tolerance limits of a master color, the program can indicate a color match. When the colors do not match or when they differ even though they do match, the program can indicate the extent to which the colors do not match for each color are red, green, blue and white. The program can indicate the amount of difference in terms of percentages or standard deviation values.

By comparing background specimens from different time periods, it can be determined if the background has become dirty or if the viewing characteristics have altered. The camera can be calibrated by comparing specific test samples placed in the light box. Known characteristics of a sample used for calibration can be directly programmed into the computer memory and stored for later reference.

In comparing colors using a standard deviation range test, the W value is quite important. Without the W value, it sometimes happens that R, G, and B values are marginally within the tolerance range of the master sample, yet the colors do not appear the same. With the presence of the W value in the comparison, a match is not present unless all of the four values match. This has proven to be very helpful in determining a match of samples with reasonable color accuracy.

With the other statistical tests employed, such as the F-test, t-test, and Kolmogorov - Smirnov test, the W value is not necessary. The white value serves as a norm function in the range test, whereas norm functions are inherent in the other tests.

The foregoing embodiment is merely illustrative of the preferred practice of the present invention and various modifications may be made without departing from the spirit and scope of the invention.

The embodiments in which an exclusive property or privilege is claimed are defined as follows:

1. A process for analyzing colors in a viewing region in an object comprising illuminating the viewing region in predetermined light, scanning the viewing region with a video camera so as to produce an electronic video output for the color values at each pixel location representative of the viewing region, converting the video output into digital data for individual components of the colors, reporting and storing the digitized values in a computer memory, analyzing the digital component values to determine the means value of the component values and the extent of variation of component values from the mean value; and selecting a predetermined variation from the mean value as a tolerance limit for comparing other colors, the tolerance limit being determined as a function of the deviation of the component values from the mean.

2. A process for analyzing colors in a viewing region in an object comprising illuminating the viewing region in predetermined light, scanning the viewing region with a video camera so as to produce a electronic vide output for the color values at each pixel location representative of the viewing region, converting the video output into digital data for individual red, green and blue ("RGB") components of the colors, reporting and storing the digitized values in a computer memory for subsequent analysis of the pattern of variation of the color values among the pixel locations, for comparison with other colors and for display, the object being viewed on a background in the viewing area and the background alone being scanned with the video camera before viewing the object, the color of the video output for the background being converted to RGB digitized values as background values and stored in the same manner as the output for the object, the background values being compared with the viewing area for the object and cancelled from the digital data for the viewing area containing the object, the resulting values reported being limited to the object and having eliminated therefrom any background values.

3. A process according to claim 2 and further comprising modifying color values to adjust for any changes in the color detection consistency of the video camera over a period of time by determining the difference between measured color values for an object of know color and previously determined digitized color values for the known color and modifying all subsequently measured color values by the amount of the difference.

4. A process for comparing colors of different objects comprising analyzing colors in a viewing region in one object by illuminating the viewing region in predetermined light, scanning the viewing region with a video camera so as to produce an electronic video output for the color values at each pixel location representative of the viewing region, converting the video output into digital data for individual components of the colors, reporting and storing the digitized values in a computer memory; repeating the foregoing process for another object; and comparing the digitized color component values of one object with the other object, the color component values for viewing regions on the two objects having been detected and stored separately, the difference between the mean color component values being determined so as to ascertain the degree of difference between the two colors for each of the color components, the difference indicating the amount of change necessary for each component in order to make the overall colors of the objects the same.

5. A process according to claim 4 wherein the color components for the viewing region for each object are statistically analyzed, and a tolerance based on standard deviation from a mean value is determined for color components in one object, the color component values of the other object are compared with the tolerance values of the one object to determine if the other object is within the tolerance limits, a match being indicated where the color component values fall within the tolerance limits.

6. A process according to claim 4 wherein tolerances based on standard deviation ranges are determined for each color component, the color components including the colors red, green, blue and white ("RGBW"), the other object being acceptable only if all of the component colors of the other object are within the tolerances of the component colors for the one object.

7. A process according to claim 4 wherein the stored digital can be displayed and printed out.

8. A process according to claim 4 wherein the separate color values stored include any of the color values for various viewing regions on the same or different objects, color values for reference and test objects, and color values for background, any of the color values being available for reference.

9. A process according to claim 4 wherein the color values for the objects represent reference and test objects, the color value comparison being displayed on a color monitor, with the display showing the actual color of the test object where the test color differs from reference object color by more than a preselected tolerance level, the displayed color of the test object being a different color from the actual color where the color of the test object matches the color of the reference object, the different color being selected so as to represent a color match between two compared objects.

10. A process for analyzing the color of a viewing region in a reference object comprising sampling individual color values at each of a large number of discrete locations on the viewing region, separating the color values into one or more component values and converting the values into numeric values, statistically comparing the numeric values of the components for the discreet locations on the viewing region so as to provide a statistical analysis of the variation in the color value in the viewing region, the analysis providing information about the nature and extent of color variation over the viewing region and not just a value reflecting an average color, the color values being sampled with a video camera, the discrete locations being the areas covered by individual pixels of the camera, the video signal being converted into a digitized electronic signal representing the numeric value of each color component for the pixel locations, the digitized values being compared by statistical analysis to determine the extent of variation of color values in the viewing area, the digitized color values being stored electronically for subsequent reference, the digitized color values being analyzed in accordance with statistical principles of standard deviations.

11. A process according to claim 10 wherein the digitized color values are analyzed to determine the mean value and for deviation from the mean in terms of standard deviations, With a tolerable deviation being determined in terms of standard deviation values.

12. A process for comparing colors in different viewing regions comprising analyzing the color of a viewing region in a reference object comprising sampling individual color values at each of a large number of discrete locations on the viewing region, separating the color values into one or more component values and converting the values into numeric values, statistically comparing the numeric values of the components for the discreet locations on the viewing region so as to provide a statistical analysis of the variation in the color value in the viewing region, the analysis providing information about the nature and extent of color variation over the view region and not just a value reflecting an average color, the color values being sampled with a video camera, the discrete locations being the areas covered by individual pixels of the camera, the video signal being converted into a digitized electronic signal representing the numeric value of each color component for the pixel locations, the digitized values being compared by statistical analysis to determine the extent of variation of color values in the viewing area, the digitized color values being stored electronically for subsequent reference, the color in the viewing region for the reference object being compared with a color value for a second viewing region for a second object, with the color in the second viewing region being sampled and digitized in the same manner as the color for the reference object, the second viewing region color being compared with the reference object viewing region color by a statistical comparison of the respective color values.

13. A process according to claim 12 wherein the video camera is calibrated with a reference object of known color, digital values of the known color being stored in a computer memory for reference, the extent of variation in color responsiveness of the camera being determined by a comparison between the known color values and the color values determined by actual measurement, the signal values being adjusted to compensate for any detected variation in the color responsiveness of the camera from the known color values. terms of standard deviation values.

14. A process according to claim 12 wherein the color values are statistically compared by means of one of the statistical tests consisting of the t-test, F-test, and the Kolmogorov-Smirnov test.

15. A process according to claim 12 wherein the process is performed to determine if the second color is acceptably close to the reference object color, a standard deviation being selected for the reference object color that is representative of the extent of color difference that is acceptable, the second color being analyzed to determine if the mean of the second color is within the limits of the acceptable standard deviation.

16. A process according to claim 15 wherein the color values are further statistically compared to determine if the mean value of the color of the reference object comes within a preselected standard deviation from the mean value of the second object color.

17. A process according to claim 12 wherein the video signal is converted to digitized values of the individual red, green, blue ("RGB") component values of the object color, and the RGB digitized values are the component values that are stored and analyzed.

18. A process according to claim 17 wherein the color values include a whiteness signal representative of the brightness of the colors in the signal, such that the signal becomes an RGBW signal, the value of the brightness component constituting one of the values reported and stored as being indicative of the color of the viewing region of the object.

19. A process according to claim 18 wherein the whiteness value of the video signal reflects the sum of the RGB values of the object.

20. A process according to claim 18 wherein the RGBW color component values are reported on an RGB color monitor to show the actual video appearance of each of the color components of the object, such a display permitting visual color comparison so as to confirm the accuracy of the electronic analysis process.

* * * * *

UNITED STATES PATENT AND TRADEMARK OFFICE
CERTIFICATE OF CORRECTION

PATENT NO. : 4,812,904

DATED : 03-14-89

INVENTOR(S) : Richard B. Maring; Martin L. Shoemaker

It is certified that error appears in the above-identified patent and that said Letters Patent is hereby corrected as shown below:

```
Claim 1, col. 7, line 1, delete "means" and substitute
      --mean--;

Claim 2, col. 7, line 11, delete the second occurrence
      "a" and substitute --an--;

line 11, delete "vide" and substitute
      --video--;

Claim 7, col. 8, line 8, insert --data-- after "digital";

Claim 12, col. 8, line 68, delete "view" and substitute
      --viewing--;

Claim 13, col. 9, lines 27-28, delete "terms of standard
      deviation values".
```

Signed and Sealed this
Nineteenth Day of December, 1989

*Attest:*

JEFFREY M. SAMUELS

*Attesting Officer*     *Acting Commissioner of Patents and Trademarks*